(12) United States Patent
Collier et al.

(10) Patent No.: US 7,574,446 B2
(45) Date of Patent: Aug. 11, 2009

(54) CONVERTING ARBITRARY STRINGS INTO NUMERIC REPRESENTATIONS TO FACILITATE COMPLEX COMPARISONS

(75) Inventors: Cody M. Collier, Littleton, CO (US); Bruce E. Kiefer, Denver, CO (US)

(73) Assignee: Catalyst Repository Systems, Inc., Denver, CO (US)

( * ) Notice: Subject to any disclaimer, the term of this patent is extended or adjusted under 35 U.S.C. 154(b) by 153 days.

(21) Appl. No.: 11/634,618

(22) Filed: Dec. 6, 2006

(65) Prior Publication Data

US 2008/0140604 A1   Jun. 12, 2008

(51) Int. Cl.
*G06F 7/00* (2006.01)
*G06F 17/00* (2006.01)
*G06F 17/30* (2006.01)

(52) U.S. Cl. .................. 707/101; 707/6

(58) Field of Classification Search ............. 707/1–3, 707/100–102, 6, 10; 704/1
See application file for complete search history.

(56) References Cited

U.S. PATENT DOCUMENTS

| | | | | |
|---|---|---|---|---|
| 5,511,193 A | * | 4/1996 | Tung et al. ........... | 719/329 |
| 7,225,181 B2 | * | 5/2007 | Tsuda ................... | 707/3 |
| 7,275,069 B2 | * | 9/2007 | Hundley et al. ...... | 707/104.1 |
| 2002/0083079 A1 | * | 6/2002 | Meier et al. .......... | 707/104.1 |
| 2003/0041059 A1 | * | 2/2003 | Lepien ................. | 707/5 |
| 2003/0046285 A1 | * | 3/2003 | Gruenwald ........... | 707/7 |
| 2004/0062389 A1 | * | 4/2004 | Etienne et al. ....... | 380/28 |
| 2004/0167888 A1 | * | 8/2004 | Kayahara et al. .... | 707/3 |
| 2005/0086209 A1 | * | 4/2005 | Chou ................... | 707/3 |
| 2006/0074971 A1 | * | 4/2006 | Groenveld ............ | 707/102 |

OTHER PUBLICATIONS

International Search Report for PCT/US2007/86669, mailed May 23, 2008.
Written Opinion of the International Searching Authority for PCT/US2007/86669, mailed May 23, 2008.

* cited by examiner

*Primary Examiner*—Wilson Lee
*Assistant Examiner*—Merilyn P Nguyen
(74) *Attorney, Agent, or Firm*—Holme Roberts & Owen LLP

(57) ABSTRACT

A method for converting arbitrary strings consisting of any combination of numbers, digits, or punctuation into numerical representations for comparisons at run time or any other time using a data store such as a relational database or full text search engine. The method is designed to build a numeric representation having small, fixed length values that are stored in numeric data types supported by the data store. All arbitrary string data is converted to a numeric representation using the method and placed in the data store. Queries of the data can be converted to a similar numeric representation.

1 Claim, 10 Drawing Sheets

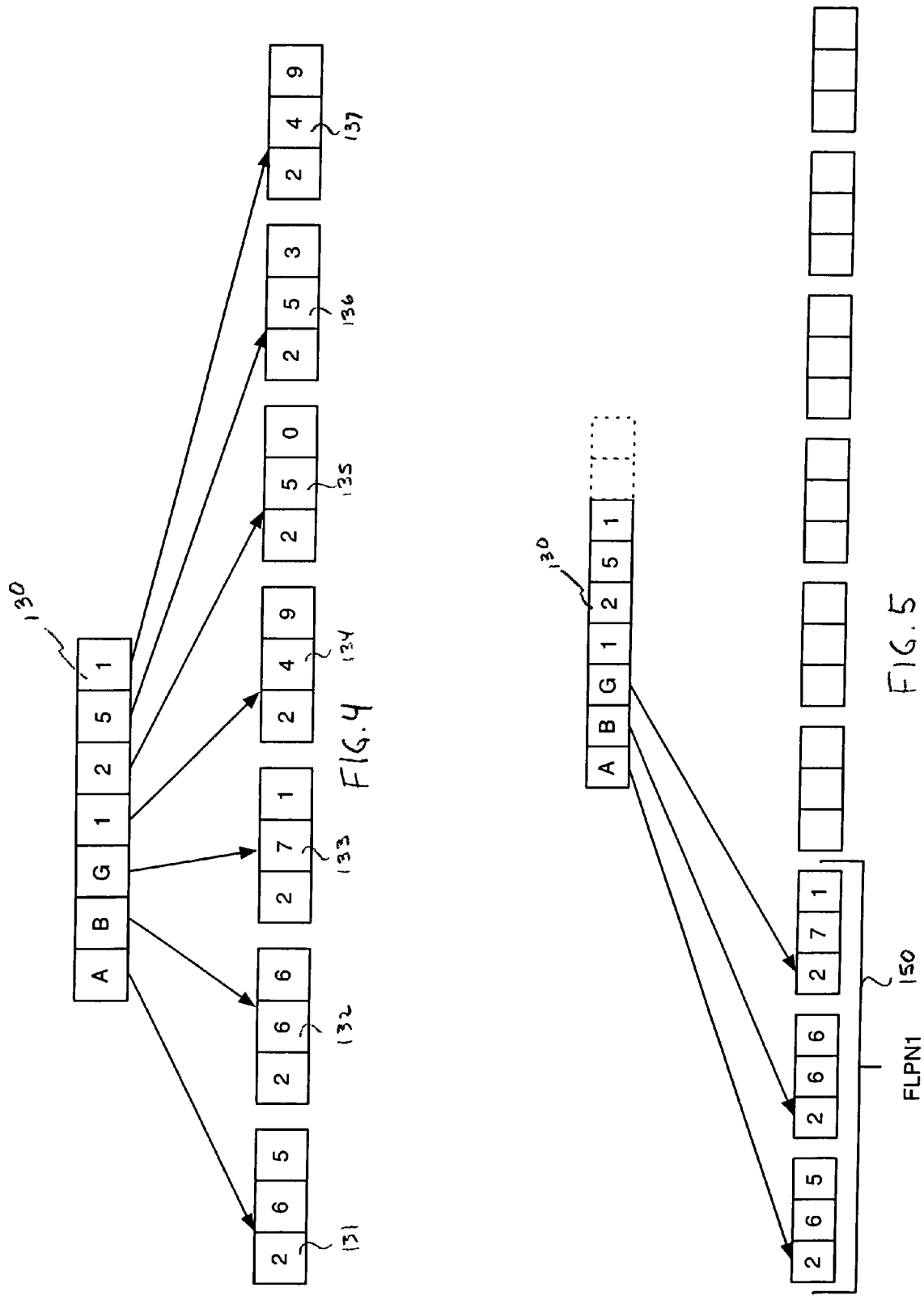

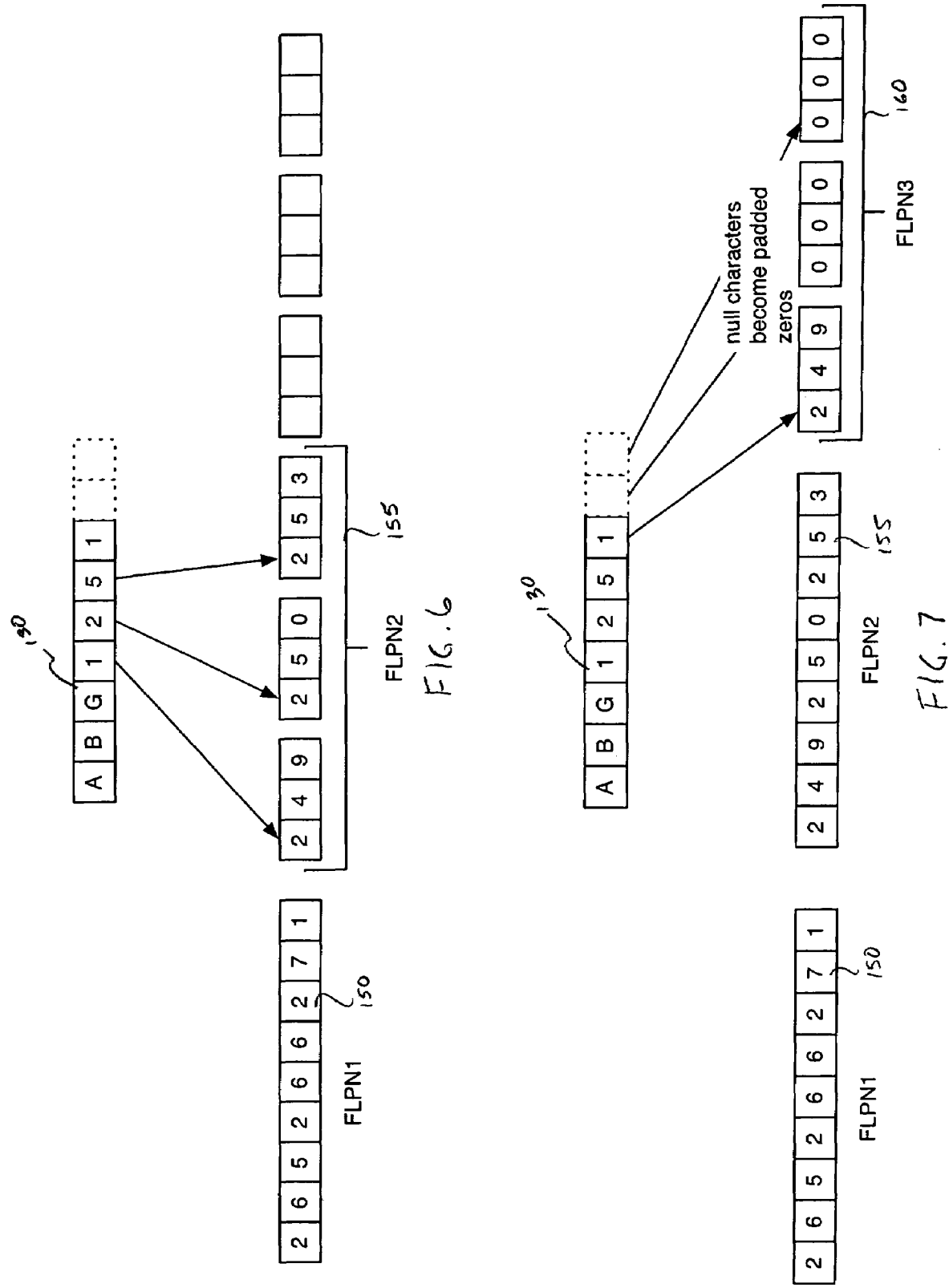

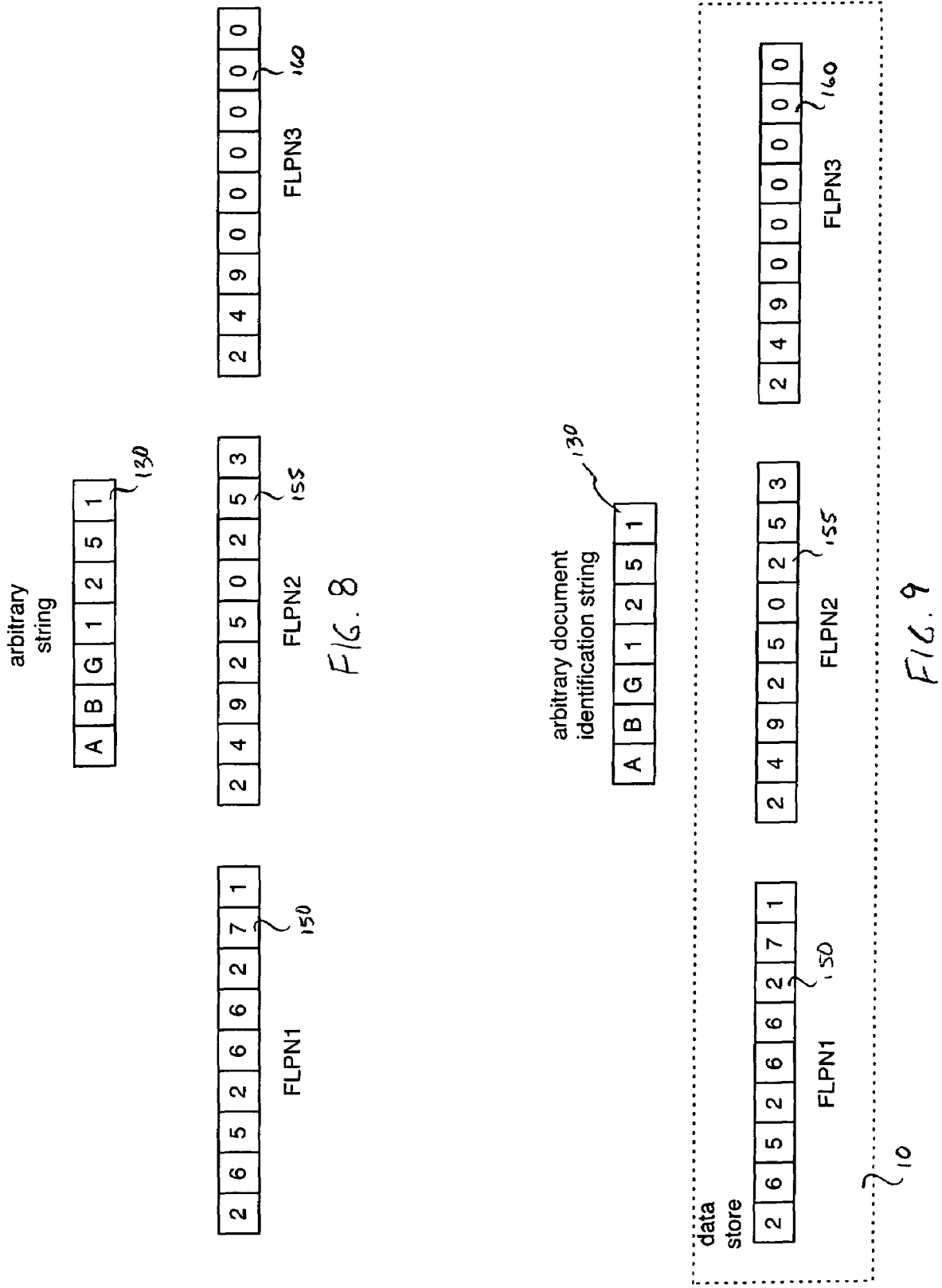

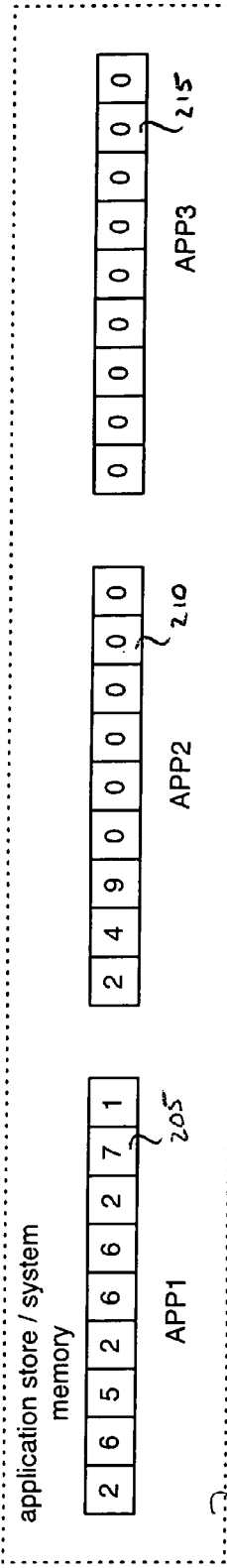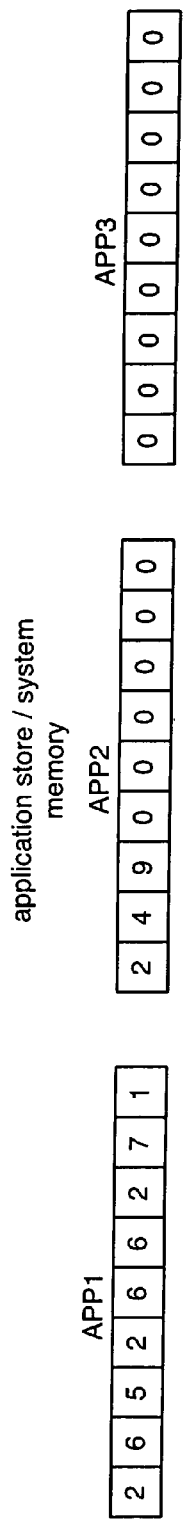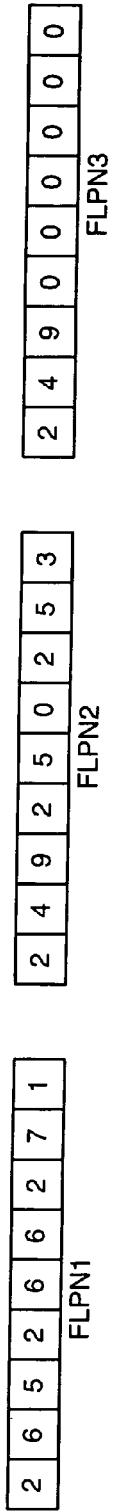
FIG. 10
FIG. 11

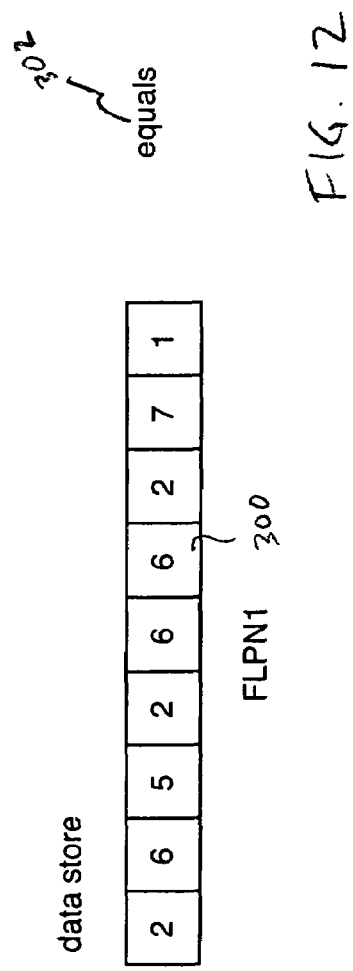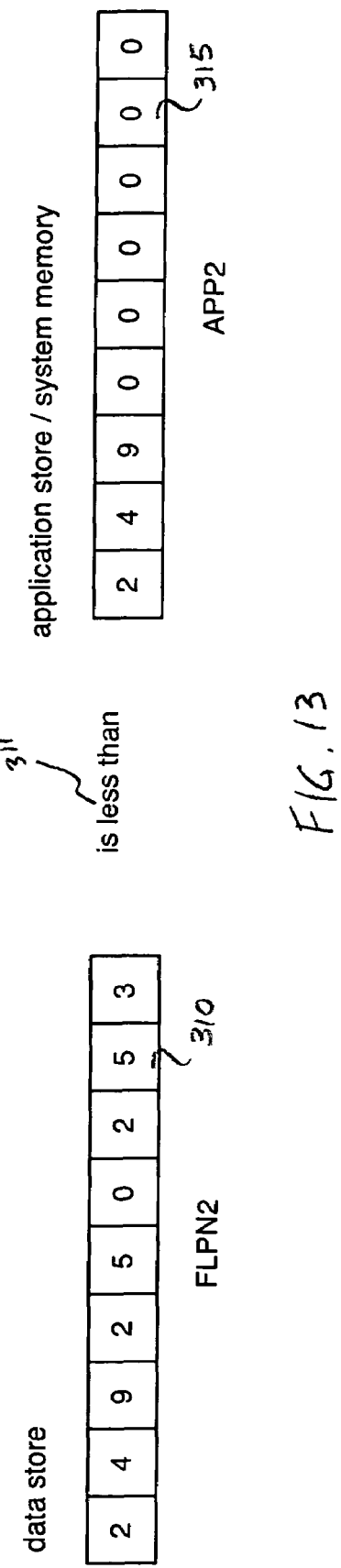
FIG. 12
FIG. 13

Results

Search Criteria: BegControl >= TT_4600_ sorted by docdate asc
Searched 258,946 records ; Found 256,203 records. (Search: 0.0501, Total: 0.2812)

Page [ 1 ] of 12811 [Go]

Copy to Folder | Bulk Update

| | Open | BegControl<br>EndControl | Date ▽ | Author<br>Recipient<br>cc |
|---|---|---|---|---|
| 1 | 📄 2 pgs | TT_4620_001<br>TT_4620_002 | | |
| 2 | 📄 2 pgs | TT_4624_001<br>TT_4624_002 | | |
| 3 | 📄 2 pgs | TT_4629_001<br>TT_4629_002 | | |
| 4 | 📄 2 pgs | TT_4633_001<br>TT_4633_002 | | |
| 5 | 📄 2 pgs | TT_4640_001<br>TT_4640_002 | | |
| 6 | 📄 2 pgs | TT_4664_001<br>TT_4664_002 | | |
| 7 | 📄 2 pgs | TT_4665_001<br>TT_4665_002 | | |
| 8 | 📄 2 pgs | TT_4667_001<br>TT_4667_002 | | |

```
[plum]$
[plum]$ ./bucket_comparison.py "begcontrol > abc123"
```

FIG. 16

```
[plum]$
[plum]$ ./bucket_comparison.py "begcontrol > abc123"
[ (begcontrolint1 > 249250251) ]
or [ (begcontrolint1 = 249250251) and (begcontrolint2 > 297298299) ]
or [ (begcontrolint1 = 249250251) and (begcontrolint2 = 297298299) and (begcontrolint3 >= 000000000) ]
[plum]$
[plum]$ ./bucket_comparison.py "begcontrol < abc123"
[ (begcontrolint1 < 249250251) ]
or [ (begcontrolint1 = 249250251) and (begcontrolint2 < 297298299) ]
or [ (begcontrolint1 = 249250251) and (begcontrolint2 = 297298299) and (begcontrolint3 <= 000000000) ]
[plum]$
```

CONVERTING ARBITRARY STRINGS INTO NUMERIC REPRESENTATIONS TO FACILITATE COMPLEX COMPARISONS

BACKGROUND OF THE INVENTION

1. Field of the Invention

The present invention generally pertains to processing and comparing data in a data store like a relational database or full text search engine. More specifically, a method for converting arbitrary strings to numeric representations is disclosed so that complex comparisons can be carried out on the numeric data values.

2. The Relevant Technology

Group collaboration poses challenges for identifying key documents and records in a database. Each group may construct a unique way to identify the document with their own naming convention and guidelines. A purchase order number to the customer, a bill of sale identifier to the vendor, and a packing list to the logistics provider could represent a single document or record. Although the problem of representing a single record with multiple identifiers has already been solved, it is not trivial to provide a generic way to use these various identifiers within a multi purpose data store environment. Conventionally, if the identifier is composed of a string and numeric value, separate methods would be required to handle each component (i.e., PO-12345 could be separated into "PO" and "12345"). If the logistics provider used an identification system that includes different numeric and string components (i.e. EFG-123-123-45-MN), the data store would have to be modified separately to handle the new scheme ("EFG" "123" "123" "45" "MN"). For each new participant in the collaboration process, new schemes or strict rules would be required to allow participation using their own identification system. This problem is made more difficult if the data store has primitive data types without custom data types.

Hence, there is a need for converting arbitrary string data into a useful format for complex comparisons. The method should allow for the greatest variety of user provided schemes and map them to the simplest of data types—the numeric field.

BRIEF SUMMARY OF THE INVENTION

The present invention provides a conversion method of arbitrary strings to numeric format so that they can be retrieved from a data store. The conversion is designed to work with a wide variety of data stores with a range of capabilities. All string data (character, numeric, punctuation) is transformed during conversion. The conversion method is flexible enough to work within constraints of the data store and date types. For example, if the numeric data type supports integers of a certain limited size, multiple numeric fields can be used to split the converted representation across many fields. The conversion method also normalizes the data to account for differences in absolute value of the representation.

For example, a character maybe converted to the number 12, but another character may be converted to 354. To properly support the comparative analysis, the transformed number must be the same number of digits. The conversion method is flexible enough to support any number of total digits, but the preferred implementation is usually 3 or 4 digits. The conversion method can split the transformed values into an appropriate number of numeric data type fields respecting transformed numeric boundaries or ignoring them, depending on the efficiency required by the native data store. Once the transformed result is generated, the data can be loaded into the data store.

In another aspect of the invention, a method is provided for taking user generated queries or any query and converting the request into the appropriate numeric representation. The conversion method is the same as the previous aspect of the invention including the normalization and splitting of the transformed result into many numeric fields. These two methods are then synchronized. This second aspect also builds the appropriate Boolean representation of the query and builds a syntax-correct query required by the data store's language interpreter. The data store can carry out the work of comparing the numeric digits and presenting comparative results. The present invention does not require that the original data be altered. The described method can be used to build alternative representations of the arbitrary strings inside the data store. The data store can be configured to return the original arbitrary string as the result of the query and thereby hide the complexity of the solution.

These aspects of the present invention may be more clearly understood by reviewing the embodiments and drawings of the claim.

BRIEF DESCRIPTION OF THE DRAWINGS

Exemplary embodiments are illustrated in referenced figures of the drawings. It is intended that the embodiments and figures disclosed herein are to be considered illustrative rather than limiting.

FIG. 2-13 illustrate one embodiment of the present invention for converting a document character string having a sequential order into a corresponding numerical representation;

FIGS. 14 and 15 illustrate a typical user interface for entering queries and returning results; and FIGS. 16 and 17 illustrate one embodiment of converting a query into a coded result.

DETAILED DESCRIPTION OF THE PREFERRED EMBODIMENTS

In the following description, numerous specific details are set forth, such as examples of specific character lengths and character encoding schemes, in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

The present invention provides a method for converting arbitrary strings consisting of any combination of numbers, digits, or punctuation into numerical representations for comparisons at run time or any other time using a data store like a relational database or full text search engine. The method is designed to build a numeric representation of small, fixed length values that are stored in numeric data types supported by the data store. All arbitrary string data is converted to a numeric representation using the method and placed in the data store. Queries of the data can be converted to a similar numeric representation. This facilitates complex comparisons like field_1>'abc'. The present invention also provides methods for building the correct query operators to handle Boolean requests to make use of the converted numeric fields.

Figure 1:
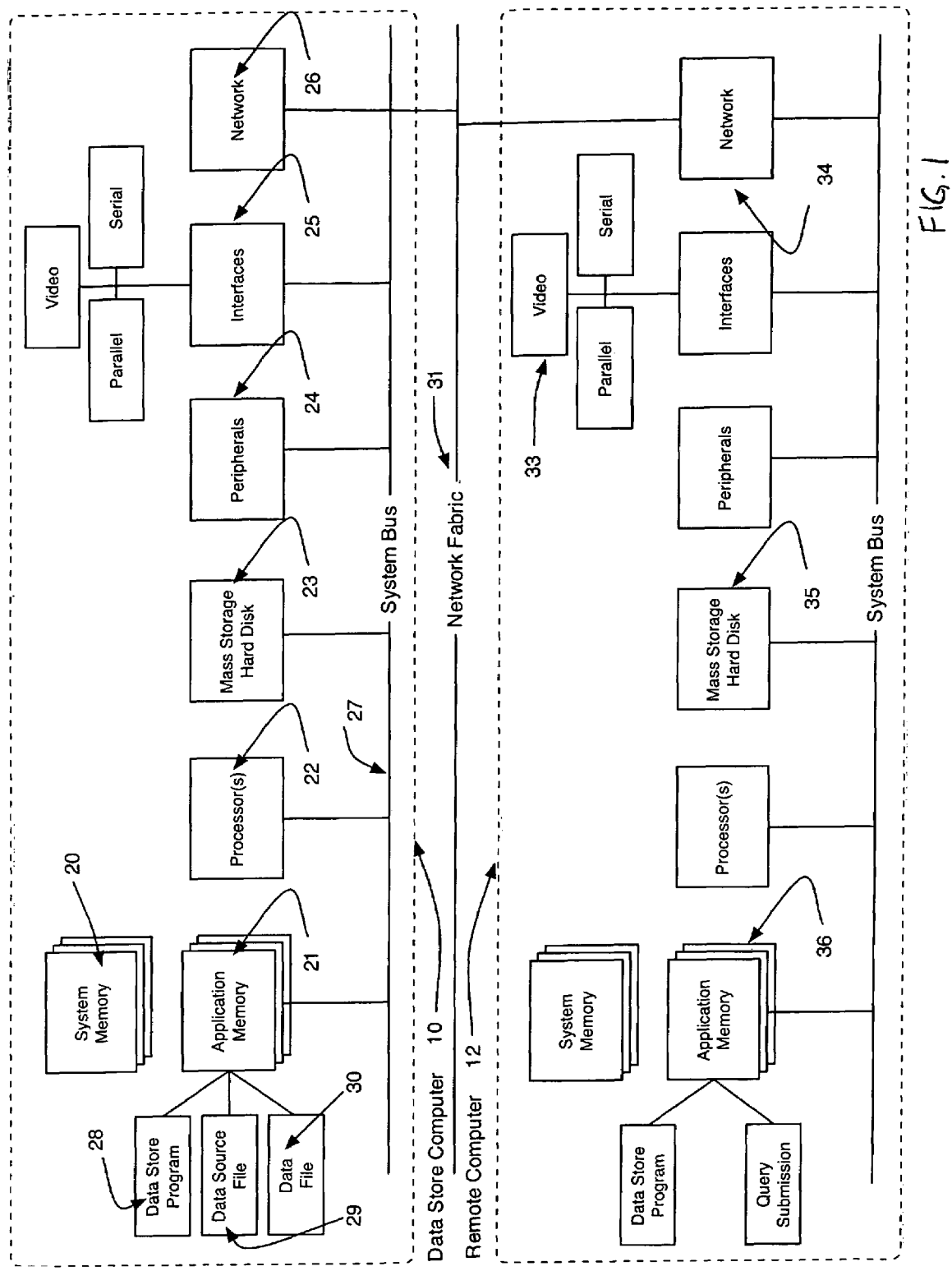
FIG. 1 illustrates one example of a computer environment in accordance with the present invention.

Example embodiments of the present invention will be illustrated by the drawings and corresponding explanation. FIG. 1 is an example environment includes two computing devices 10, 12 illustrated as a personal computer. FIG. 1 represents a typical operating environment for implementing the present invention, however, as one of skill in the art can appreciate, there are an infinite number of ways to implement the present invention without departing from the intended scope and spirit. For example, any number of combinations of database elements and server elements may replace the items shown. Therefore, the illustrated environment in FIG. 1 is in no way limiting.

Personal computer 10 comprises system memory 20 and application memory 21, a processing core including one or more processors 22, access to mass storage 23, peripherals 24, interfaces 25 and commonly a network access device 26. Each item of the personal computer system is coupled to a system bus 27 for allowing coordinated communication between all of the components. This first computer 10 would be the home of the data store software and program files 28. Although this is an exemplary setup, those skilled in the art will readily recognize that there are many permutations of this simplified set up including, but not limited to, wireless network, removable storage devices, solid state media devices, processing farms, multi processing cores, various memory enhancements, and improvements on the basic interfaces like USB, Firewire, SATA, SCSI to name a few. A number of programs may be stored on the main storage hard disk 23 and then loaded into memory for execution 21. The data store implements routines, sub-routines, objects, programs, procedures, components, data structures and other necessary aspects that comprise the data store program 28. The data store program works with the data source file 29 and data file 30 to create, delete or manipulate data.

Through the network fabric 31, computers are able to talk to each other using protocols such as TCP/IP and media choices including Ethernet. Those skilled in the art will understand that there are many permutations of this network fabric and the chosen network fabric is not intended to be limiting in any way. Accordingly, the present invention is capable of running on any of those permutations.

A user or another software program may input queries through the remote computing environment 12 using various input devices connected to the interfaces like, but not limited to, a mouse, keyboard, keypad, microphone or touch screen. A display device is often connected to the system 33 to handle visual interaction with the user, but the present invention is capable of running without a visual interface by use of a program or module or subroutine, or an audio interface to handle the input. The remote computer is often connected to the network through network interface or adapter 34, but could be connected wirelessly, through a modem or directly coupled to the computer running the data store. Those skilled in the art will appreciate that this is exemplary and the present invention will perform over a multitude of communication links. The remote computer 12 runs some portion of the program module loaded from hard disk 35 into application memory 36. The present invention can be implemented in any division of client and server workload and this illustration serves only to be an example.

Additionally, those skilled in the art will appreciate that the present invention is capable of being implemented in many other configurations including, but not limited to, terminals connected to host servers, hand held devices, mobile devices, consumer consoles, special purpose machines to name a few.

Figure 2:
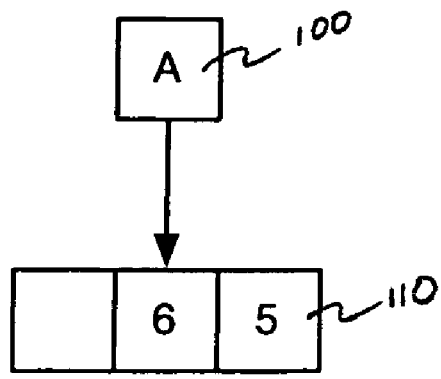

FIGS. 2-12 illustrate one embodiment of the present invention for converting a document character string having a sequential order into a corresponding numerical representation. Typically, the document character string comprises a number of characters such as numbers, letters and punctuation. It should be readily apparent to one of skill in the art that the illustrated method is just that and certain choices such as character length and constant choice are not intended to limit the invention in any way. FIG. 2 illustrates using a method of creating numeric representations from a character encoding scheme. In the embodiment shown, an ASCii look up is used for the transformation of the character from the document character string into a numeric digit, however, other character encoding schemes such as Unicode may be used without departing from the scope and spirit of the invention. In the illustrated embodiment, the letter 'A' 100 is converted to the numeric representation '65' 110. It should be appreciated that the present invention in no way requires this particular implementation, however, using ASCii as a conversion method illustrates the process. Other conversion equations are equally successful if consistent between the two aspects previously presented.

Figure 3:
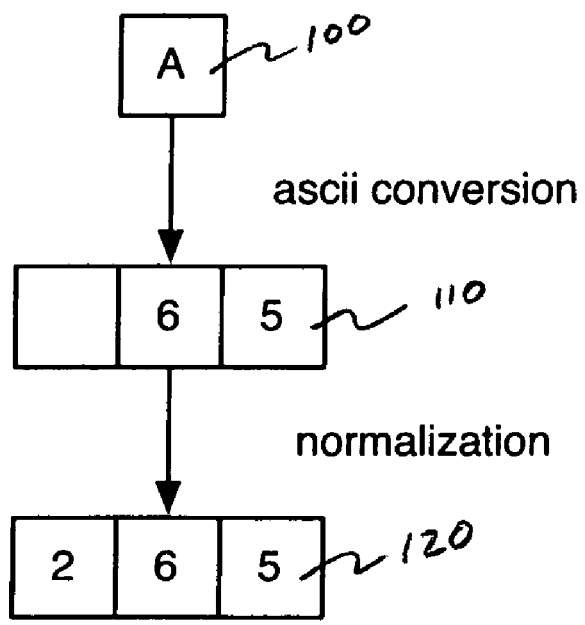

As shown in FIG. 3, the normalization step takes place to account for any differences in the transformation equation. The normalization should present all transformed sequences as the same length. In the illustrated embodiment, the letter 'A' 100 is converted to its ASCii equivalent '65' 110. The present invention then normalizes the ASCii values to provide a uniform length integer referred to as a fixed length integer. In the illustrated embodiment, a constant 200 is added to the ASCii value to return a fixed length integer of '265' 120. The constant value of 200 is illustrative only, and so referral any constant may be used in accordance with the present invention that results in a fixed length integer.

FIG. 4 illustrated the conversion and transformation of a document character string 130 into a corresponding numeric value 140. Document character string 130 may be any type of character string such as a bates number or a purchase order to name a few. Numeric representation 140 comprises a number of fixed length integers 131, 132, 133, 134, 135, 136, 137 concatenated to form a larger integer equivalent of document character string 130. As shown, the characters in the document character string 'ABG1251' are converted to their corresponding ASCii equivalents (not shown), which are then normalized to create the corresponding fixed length integers '265' 131, '266' 132, '271' 133, '249' 134, '250' 135, '253' 136 and '249' 137 respectively. The conversion is such that the integrity of the sequence of the original document character string 130 is maintained in the integer equivalent 140.

FIG. 5 shows an example of grouping a predetermined number of the fixed length integers 131, 132, 133, 134, 135, 136, 137 representing the characters in the document character string 130 into smaller units that will be supported by the dimensions of the primitive numeric data type used in the data store. In the illustrated example, the fixed length integers 131, 132, 133 corresponding to the first three characters of the document character string are grouped together to form a fixed length primitive numeric string (FLPN) 150. Any number of fixed length integers may be used to create an FLPN. Continuing, FIG. 6 illustrates grouping together the fixed length integers 134, 135,136 corresponding to the second three character set of the document character string 130 to form FLPN 155. In FIG. 7, there is only a single character in the final three character set of document character string 130. The fixed length integer 137 corresponding to the final character of the document character string 130 forms part of the FLPN 150 and the null characters of document character string 130 become padded zeros as shown. In accordance with the present invention, after deciding on the total number of numeric data types to accommodate the largest of the arbitrary strings transformed by the function, the method pads the remaining types with zeros As shown in FIG. 8, the document character string or arbitrary string 130 is converted to a number of FLPN's 150, 155, 160 while maintaining the integrity of the sequential order of the original characters of the string 130. Accordingly, the resulting grouping 165 is an example of a completely transformed arbitrary string or document character string 130 that has been normalized both for total digits of the individual value and normalized for the total digits of the complete value 150, 155, 160. Illustrated in FIG. 9, the resulting transformation is stored in the data store 10 using the methods provided by the data store as described with respect to FIG. 1.

FIG. 10 illustrates the same function as described above with respect to the document character string being used to transform arbitrary queries 200 supplied by either users or routines, programs, or subroutines into its respective FLPN's 205, 210, 215. The resulting FLPN's 205, 210, 215 are stored in memory such as the application store/system memory 36 illustrated in FIG. 1. Once the query has been transformed, FIG. 11 illustrates how comparisons can be made between each of the smaller numeric data types.

FIGS. 12 and 13 are used to illustrate example comparisons that can be made. In the illustrated example of FIG. 12, the FLPN 300 in the data store is compared to the FLPN 305 in the application store/system memory in accordance with operand 302. As shown, the operand "equals" is used to determine if the value of FLPN 300 is equal to the value of FLPN 305. Results will be returned to the user in accordance with this comparison, as will be described with regards to FIGS. 14-17. Similarly, the FLPN 310 in the data store is compared to the FLPN 315 in the application store/system memory in accordance with operand 315. As shown, the operand "is less than" is used to determine if the value of FLPN 300 is less than the value of FLPN 305. The present invention is not limited to only these comparisons. Those skilled in the art will be able to derive many other comparisons that could be useful for different end goals. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

Figure 14:
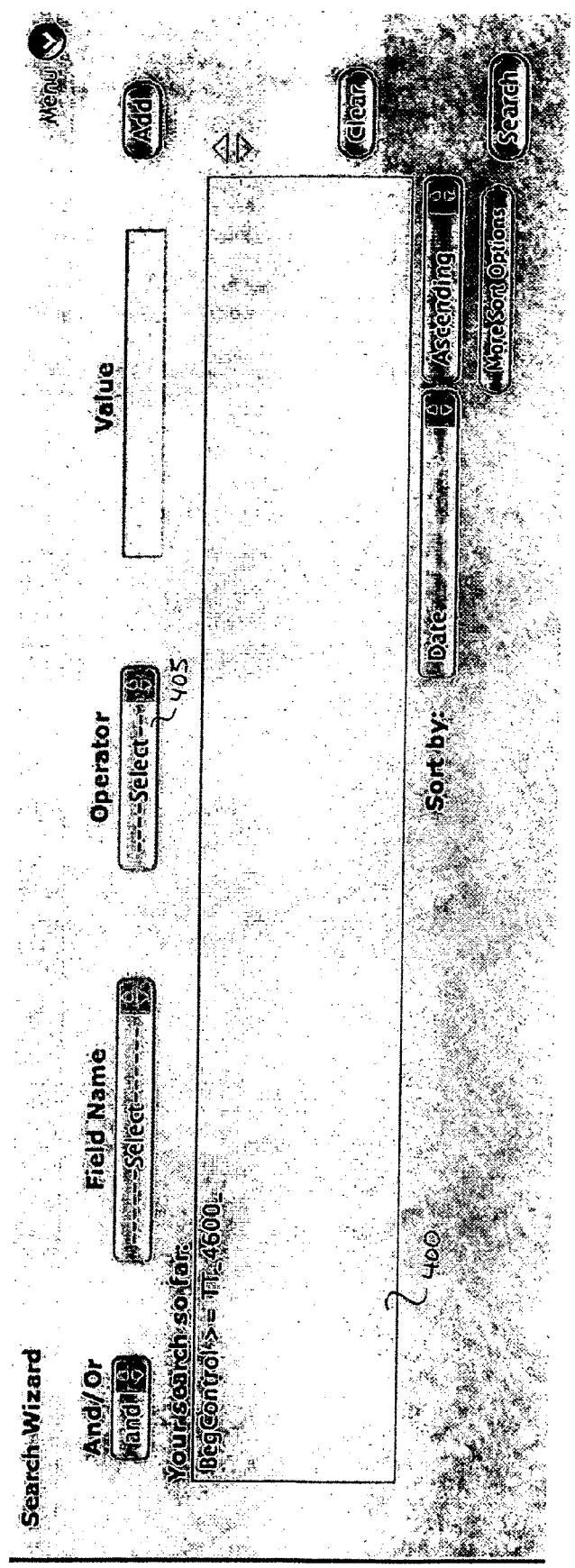

FIGS. 14 and 15 illustrate a typical user interface for entering queries and returning results in accordance with the present invention. As shown in FIG. 14, the user inputs a desired document identification string into field 400. In the illustrated example, the user enters a bates number of 'TT 4600' and then selects an operand 405, such as 'equals' or 'less than' or 'greater than' to name a few. The method described with respect to FIGS. 2-13 is then performed in accordance with the inputs of the query so as to return the desired results 410 that meet the specified criteria entered, as shown in FIG. 15. The illustrated graphical user interface is one example of entering queries and returning results, however, there are an infinite number of ways to accomplish the same and the illustrated example should in no way be limiting to the described invention.

FIGS. 16 and 17 illustrate one embodiment of converting a query 500 into a coded result 505 that may be sent to a query interpreter associated with a data store (not shown). In the illustrated example, the coded result is intended to be used with FAST Range Searching, however, any suitable search method may be used without departing from the scope and spirit of the present invention. The illustrated example is meant to demonstrate the coding of the query to be used in the comparisons, and accordingly, is not meant to be limiting. Any number of ways may be used to accomplish the same result.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

We claim:

1. A computer implemented method for converting a document character string into a numerical string representation, said document character string comprising a plurality of characters chosen from a group consisting of numbers, letters and punctuation, said method comprising:

converting each of said plurality of characters to a plurality of corresponding first document equivalent characters;

converting each of said plurality of corresponding first document equivalent characters to a plurality of corresponding second document equivalent characters by adding a constant to each of said first document equivalent characters;

grouping a number of said second document equivalent characters into a document string representation, each document string representation having a predetermined number of second document equivalent characters;

storing said document string representation in memory;

electronically receiving a document identification string and operand, said document identification string comprising a plurality of document identification characters chosen from said group consisting of numbers, letters and punctuation;

converting each of said plurality of document identification characters to a plurality of corresponding first document identification equivalent characters;

converting each of said plurality of corresponding first document identification equivalent characters to a plurality of corresponding second document identification equivalent characters;

grouping a number of said second document identification equivalent characters into a document identification string representation;

storing said document identification string representation in said memory;

comparing said document identification string representation to said document string representation based upon said operand; and in response to said operand and said comparison, electronically returning results of said comparison.

* * * * *